March 13, 1951 C. R. EDELSOHN 2,545,346

AUTOMATIC FREQUENCY CONTROL FOR TELEVISION RECEIVERS

Filed March 22, 1950 3 Sheets-Sheet 1

INVENTOR.
CHARLES R. EDELSOHN
BY
Alden D. Redfield
ATTORNEY.

March 13, 1951 C. R. EDELSOHN 2,545,346

AUTOMATIC FREQUENCY CONTROL FOR TELEVISION RECEIVERS

Filed March 22, 1950 3 Sheets-Sheet 2

INVENTOR.
CHARLES R. EDELSOHN
BY
Alden D. Redfield
ATTORNEY.

March 13, 1951 C. R. EDELSOHN 2,545,346

AUTOMATIC FREQUENCY CONTROL FOR TELEVISION RECEIVERS

Filed March 22, 1950 3 Sheets-Sheet 3

INVENTOR.
CHARLES R. EDELSOHN
BY
Alden D. Redfield
ATTORNEY.

Patented Mar. 13, 1951 2,545,346

UNITED STATES PATENT OFFICE 2,545,346

AUTOMATIC FREQUENCY CONTROL FOR TELEVISION RECEIVERS

Charles R. Edelsohn, Cincinnati, Ohio, assignor to Avco Manufacturing Corporation, Cincinnati, Ohio, a corporation of Delaware Application March 22, 1950, Serial No. 151,294

13 Claims. (Cl. 315—27)

The present invention relates to improvements in automatic frequency control (AFC) systems of the type employed in the deflection systems of television receivers. The invention also embraces novel means and methods for indirectly controlling the phase relationship between the input synchronizing pulse and the system output pulse. While not limited to utility in a horizontal deflection system, the invention is of particular advantage therein.

In prior art systems, wherein a sawtooth generator is employed for initiating the sweep currents, the automatic frequency control potential is derived by measuring the phase difference between the synchronizing pulse and a feedback signal taken from the output of the deflection system. These circuits are described in an article by E. L. Clarke, page 497 et seq., "Proceedings of the Institute of Radio Engineers," vol. 37, No. 5, published by the Institute of Radio Engineers, at New York, New York, May 1949, and in an article by John A. Cornell, page 58 et seq., "Radio and Television News," vol. 43, No. 1, published by the Ziff-Davis Publishing Company, at Chicago, Illinois, January, 1950. In lieu of further detailed explanation of the prior art, these two articles are to be considered as incorporated into the specification as a part thereof.

A primary object of the present invention is to provide an improved automatic frequency control circuit wherein a deflection system having a low resonant frequency may be tolerated without sacrificing any useful portion of the blanking period.

A further object of the invention is to phase advance the actual retrace portion of the sawtooth deflection wave with respect to the given synchronizing pulse.

The standard television signal as established by the Federal Communications Commission superimposes each synchronizing pulse upon a blanking pulse. As is well known to those skilled in the art, the synchronizing pulse is utilized to control the pulse repetition frequency of the sawtooth-characteristic deflection voltage or current while the blanking pulse is used to cut off the electron beam of the cathode ray tube during the retrace portion of the sawtooth wave. As described in the abovementioned articles by Clarke and Cornell, in indirectly synchronized AFC systems, the pulse repetition frequency of the sawtooth wave is controlled by a direct current potential having a magnitude proportional to the average phase relation between the synchronizing pulse and a feedback reference pulse.

The circuit of the present invention delays the reference pulse, whereby the phase comparator controls synchronization by comparing the synchronizing pulse and the delayed reference pulse. Although my invention may be practiced by using a reference pulse in synchronism with any portion of the output wave, the specific embodiment, shown for purposes of explanation only, uses a reference pulse which is produced simultaneously with the retrace portion of the sawtooth wave. Since actual retrace obviously leads the delayed reference pulse, then by inserting this delay means actual retrace is time advanced relative to the synchronizing pulse.

For a better understanding of the present invention, together with other and further objects, advantages and capabilities thereof, reference is made to the following disclosure and appended claims in connection with the accompanying drawings, in which:

Figure 1:
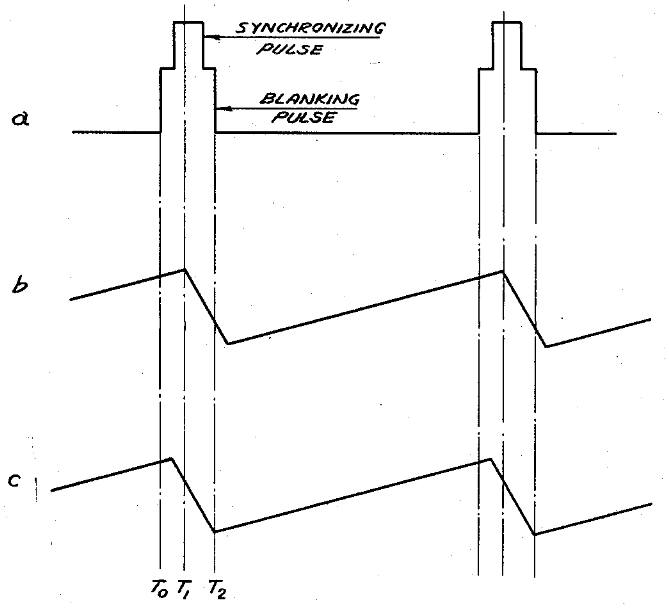
Fig. 1 is a set of curves showing the position of the sawtooth-characteristic deflection wave relative to the standard synchronizing pulse.

The curves of Fig. 1 are idealized wave shapes which illustrate the problem encountered in using an electromagnetic deflection system having a low resonant frequency. The relatively long (e. g. 8 to 8.5 microseconds) retrace portion of the sawtooth shaped coil current wave shown in Fig. 1b is a typical shape to be expected from such a deflection system. As is the usual case, in conventional indirectly synchronized automatic frequency control systems, the start of the retrace period, Fig. 1b, lags the leading edge of the sync pulse, Fig. 1a. Because of this inherent lag, the blanking pulse pedestal, shown in Fig. 1a, upon which the synchronizing pulse is superimposed, does not cover the retrace period and the electron beam of the cathode ray tube is picture-signal modulated during the last part of retrace. This extension of the retrace period for 1 to 2 microseconds beyond the blanking period results in picture folding and other deleterious effects.

It is well known that the problem of advancing the retrace portion of the sawtooth wave, relative to the synchronizing pulse, cannot be solved by mere adjustment of the pulse generator time constants.

Therefore, the problem narrows down to one of modifying a television automatic frequency control circuit so as to phase advance the sawtooth output pulse, relative to the synchronizing pulse, without changing the free running frequency of the deflection pulse generator. By thus phase advancing the sawtooth wave as is shown in Fig. 1*c*, the retrace period is made to occur during the blanking pulse period, when the electron beam in the cathode ray tube is cut off.

Figures 2, 3:
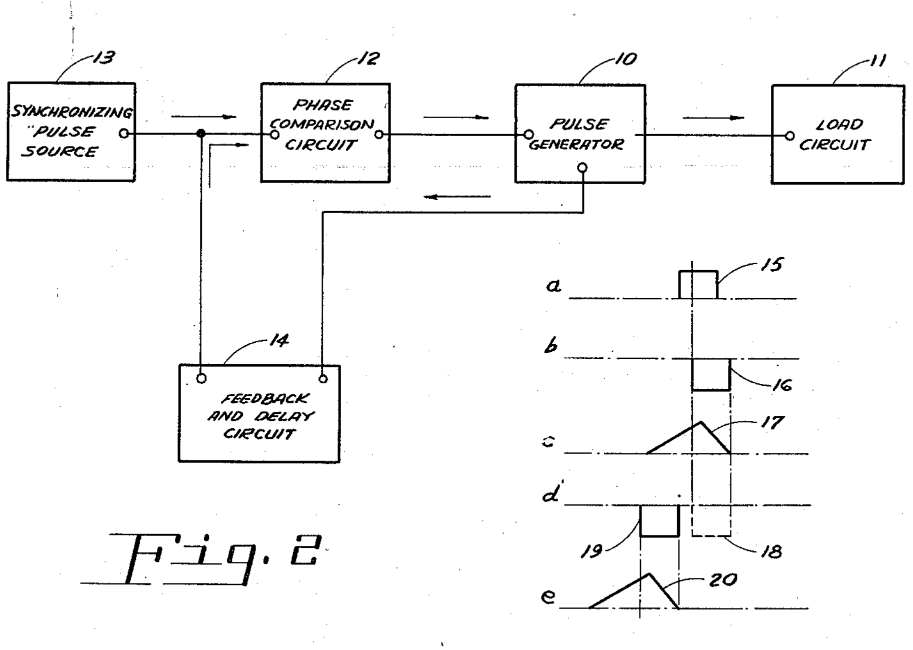
Fig. 2 is a circuit diagram in block form, to be used in describing the invention, showing the delay circuit inserted in an automatic frequency control system.
Fig. 3 is a set of curves used to explain the operation of the circuit of Fig. 2.

In accordance with the invention, there is shown in the block diagram of Fig. 2, an indirectly synchronizing deflection system for a television receiver comprising: a pulse generator 10 whose frequency is direct-current signal-controlled, a load circuit 11 coupled to the output of said pulse generator, phase comparison means 12 coupled to the input of said generator for determining the phase relationship between a synchronizing pulse supplied by source 13 and a reference pulse supplied by pulse generator 10 and fed back via feedback and delay circuit 14. As hereinafter more fully described, the addition of the delay circuit in element 14 causes the output pulse of pulse generator 10 to be phase advanced relative to the synchronizing pulse which is fed to the phase comparison circuit.

A conventional indirectly synchronized deflection system for television receivers, does not have a delay circuit included in the feedback path between the pulse generator 10 and the phase comparison circuit 12. Assuming that the delay circuit incorporated in element 14 is omitted, phase comparison circuit 12 attempts to synchronize the input pulse from source 13 and the feedback pulse from pulse generator 10, by developing a direct current control potential which is proportional to the average phase difference between the two input signals. This direct current potential or sensing voltage, in turn, acts as a variable bias source for pulse generator 10, and controls its pulse repetition frequency.

Operation of the circuit, first assuming that the delay circuit in element 14 is omitted, can be more fully understood by referring to the curves of Fig. 3. Pulse 15, Fig. 3*a*, represents a single pulse, of the pulse train realized from pulse source 13, while pulse 16, Fig. 3*b*, is a feedback pulse derived from pulse generator 10. It is to be noted that pulse 16 is produced simultaneously with the retrace portion of the sawtooth characteristic wave 17, shown in Fig. 3*c*, which is also produced by pulse generator 10. Therefore, since the reference pulse is kept in synchronism with the input pulse, though slightly phase lagging, it follows that the retrace portion of the sawtooth characteristic output pulse is also kept in synchronism with the input synchronizing pulse, and slightly phase lagging the said input pulse.

When the delay circuit is added to the feedback element 14, the reference pulse is delayed before being fed back to the phase comparison circuit 12. Fig. 3*d* shows this delayed reference pulse 18 in dotted form. It should be noted that the actual undelayed reference pulse 19 leads the delayed reference pulse 18, as shown in Fig. 3*d*. The phase comparison circuit now operates to develop a sensing voltage proportional to the phase difference between the delayed reference pulse 18 and the sync pulse 15, in lieu of the actual undelayed reference pulse 19 and the sync pulse 15. At first this would result in a D. C. sensing voltage being developed, by the phase comparison circuit, with is sufficient to phase advance the delayed reference pulse 18, and bring it into synchronism with the synchronizing pulse 15 supplied by source 13. Therefore, the actual undelayed reference pulse 19 leads the sync pulse. Of course, once the delayed reference pulse 18 and the sync pulse 15 partially coincided in time phase, the phase comparison output voltage returns to a value just sufficient to maintain this relationship. Since the actual reference pulse is produced simultaneously with the retrace portion of the sawtooth wave 20, it follows that the retrace portion of the sawtooth wave output pulse also leads the sync pulse 15, as shown in Fig. 3*e*. It can then be seen, that the addition of a delay device to feedback circuit 14 results in phase advancing the output pulse relative to the input sync pulse.

Figure 4:
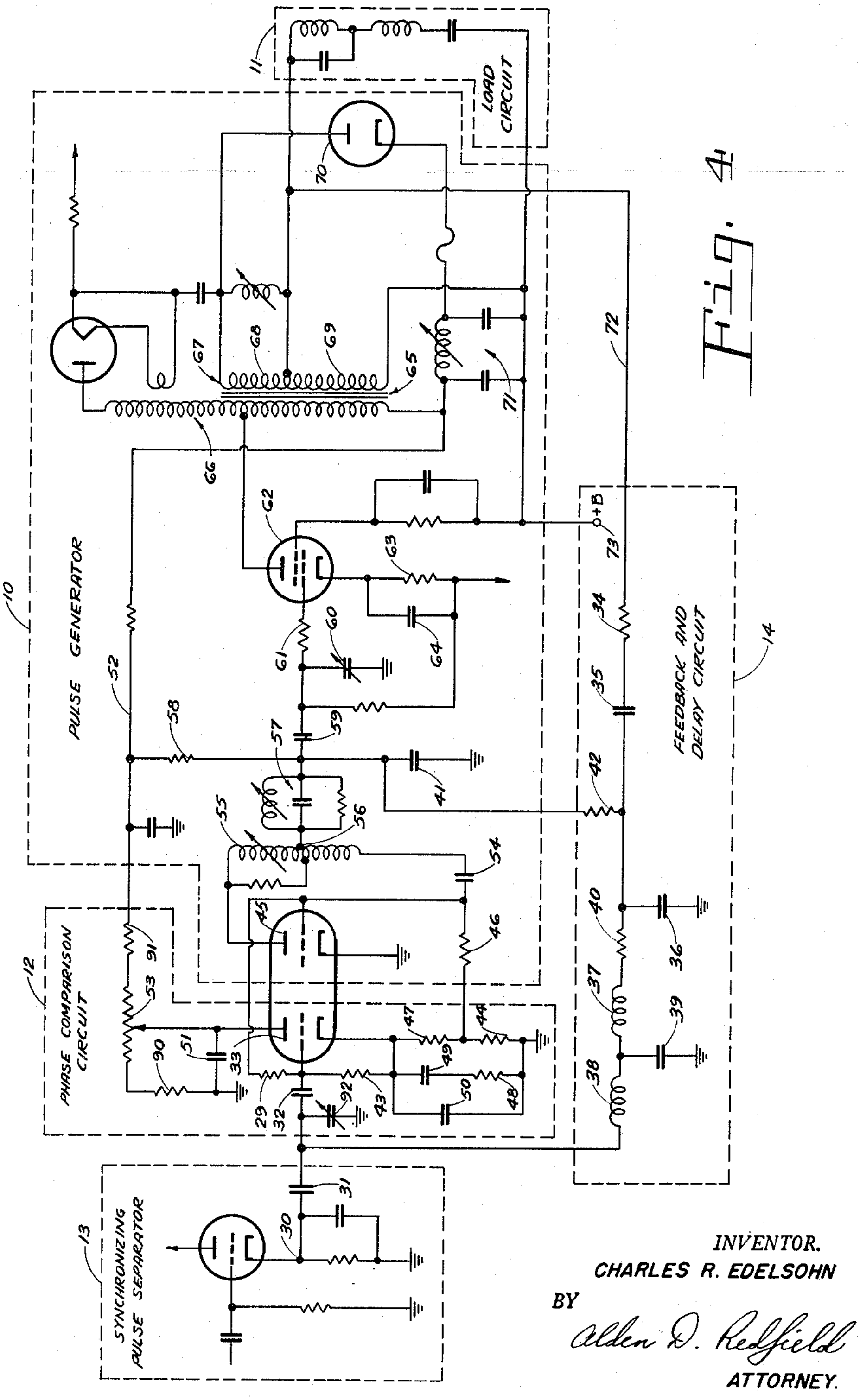
Fig. 4 is a schematic circuit diagram of a particular embodiment of the invention.

The illustrative horizontal system, herein shown in Fig. 4, comprises a blocking oscillator with automatic pulse width control. The horizontal synchronizing pulses are applied with positive polarity from terminal 30 of the synchronizing signal separator through coupling capacitors 31 and 32 to the grid of a triode 33. High voltage negative pulses obtained from the output of the pulse generator system are partially integrated and attenuated by a network comprising series resistor 34, series capacitor 35, and shunt capacitor 36, and are also applied to the input of a delay line comprising inductances 37, 38, and capacitor 39 along with damping resistor 40. Pulses of a third wave shape are obtained from the sawtooth capacitor 41 and integrated by a network comprising series resistor 42 and shunt capacitor 36 to form parabolic wave shapes. Tube 33 is the control tube and is biased near cut-off by the D. C. component of the blocking oscillator grid voltage applied through resistors 29 and 43. The plate current of tube 33 consists essentially of pulses, the width of which are determined by the relative phases of the synchronizing pulses fed from terminal 30 and the delayed composite pulses fed from the output of the delay line. The voltage developed across resistor 44 by the average plate current is fed from the cathode circuit of tube 33 across the input circuit of the blocking oscillator triode 45 by way of resistor 46 in order to control the frequency of the blocking oscillator and thereby to maintain the phase relationship between the delayed composite feedback pulse and the synchronizing signals. The cathode circuit of tube 33 is an integrating network comprising resistors 44, 47 and 48, and capacitors 49 and 50. The cathode circuit integrating network has a fast response, in that capacitor 50 is relatively small, and a slow response, in that capacitor 49 and resistors 44 and 47 are relatively large. The fast time-constant network tends to prevent hunting, while the slow time-constant network filters out disturbances of greater duration. The plate of the control tube is by-passed by a capacitor 51 and connected to the anode voltage line 52 through a potentiometer 53. The plate current flow of tube 33 along with the discharge current of capacitors 49 and 50, passing through the cathode resistor 44, controls the grid bias of the blocking oscillator tube 45 to produce synchronization, the resistor 44 being common to the grid circuit of blocking oscillator tube 45 and the time-constant circuit comprising capacitor 49, resistor 47, and resistor 48.

The blocking oscillator circuit comprises a triode 45, an auto-transformer 55 connected with capacitor 54 between plate and grid, and a sawtooth capacitor 41 effectively coupled between a tap 56 on the auto-transformer and ground. A resonant circuit 57 is interposed between tap 56 and the high potential terminal of capacitor 41. Plate voltage is supplied to the blocking oscillator through a circuit comprising lead 52, dropping resistor 58, resonant circuit 57, tap 56, and a winding of auto-transformer 55. The sawtooth voltages employed for horizontal deflection are developed across capacitor 41, tube 45 functioning not only as a blocking oscillator tube but also as a discharge tube, as described in the aforementioned article in the May issue of Proceedings of the I. R. E.

The discharge capacitor is coupled by capacitor divider 59—60, and a grid resistor 61, to the grid of a horizontal output amplifier tube 62, the latter being provided with a cathode resistor 63, by-passed by a capacitor 64. The output of this amplifier stage is coupled by a transformer network 65 to the deflecting coil load 11, and the current waves appearing in the plate circuit of this amplifier tube are employed to produce periodically recurring sawtooth currents of line frequency in load 11, thereby to deflect the electronic beam in the picture tube at line frequency.

The system intercoupling the horizontal output tube and the deflection yoke will be understood by reference to the following patents and publications: Kiver, Television Simplified, pages 207-213, second edition, 1948, D. Van Nostrand, Inc., New York; U. S. Patent No. 2,440,418, Tourshou. Reference to those publications is made for a detailed description of this network. Briefly, however, the primary 66 of the horizontal output transformer is coupled to a secondary 67 comprising series portions 68 and 69, of which portion 69 is coupled across the load circuit 11. It will be understood that the coils 11 form part of a yoke assembly encircling the neck of a cathode ray image reproducing tube which is not shown.

The voltage variations applied to the input circuit of power tube 62 produce a rising current in this tube during the scanning period which current is cut off at the beginning of retrace time. The current in the deflection coils 11 and the horizontal output transformer does not disappear at the instant of cut-off of tube 62, however, due to the inherent distributed capacity of the circuit. The inductance of these coils and the transformer, together with the abovementioned distributed capacity, forms a tuned circuit in which oscillations would normally be produced. These oscillations begin with the start of retrace time and continue for one-half of the normal period of oscillation, the oscillation being stopped at the negative current peak by a series combination of a diode 70 and a linearity control circuit 71 connected across the secondary 69. The highly peaked negative pulse which is realized across the deflection coils during retrace is coupled via line 72 to feedback and delay circuit 14. The polarities immediately following retrace are such that damper tube 70 conducts and continues to conduct until tube 62 again becomes conductive. The voltage developed across linearity control circuit 71 is such as to increase or boost the voltage of the D. C. power source (not shown) connected to terminal 73. It will be noted that the anode potential line 52 is connected to terminal 73 through linearity control circuit 71 to supply anode potential to tubes 33 and 45. The plate of tube 62 is connected to terminal 73 through primary 66 and linearity control circuit 71 to supply anode potential to tube 62.

Figure 5:
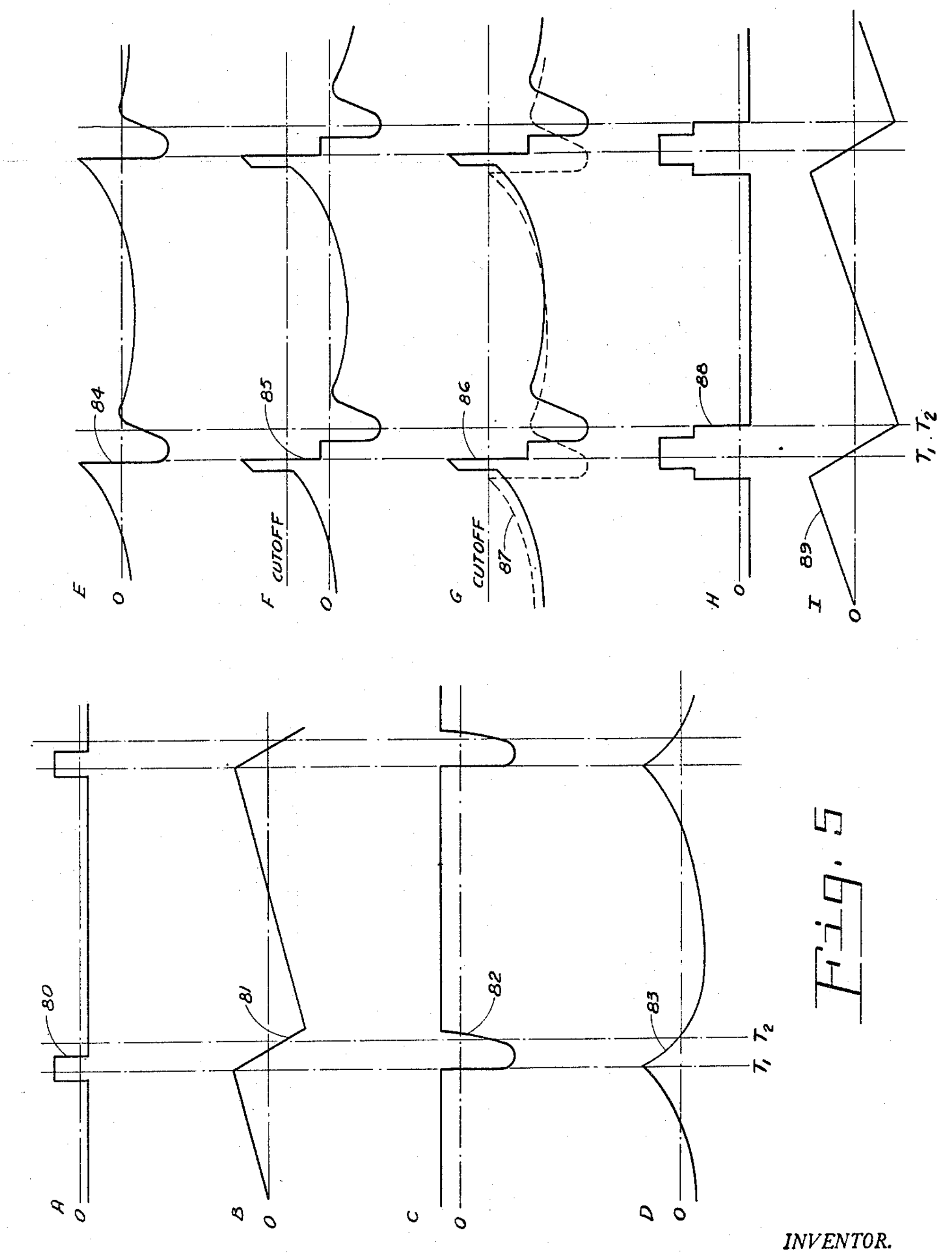
Fig. 5 is a series of curves used in describing the operation of the circuit of Fig. 4.

The circuit shown in Fig. 4 will be more easily understood by referring to curves shown in Fig. 5. In order to explain the operation of the circuit, its functions will first be considered, assuming the absence of the delay line in the feedback and delay circuit 14. The input circuit of phase comparison tube 33 receives both a synchronizing pulse 80 shown in Fig. 5A and a composite feedback pulse 84 shown in Fig. 5E. This composite feedback pulse 84 is formed by adding a sharp negative going pulse 82 shown in Fig. 5C, and a cusp shaped or parabolic wave 83 shown in Fig. 5D. The sharp negative pulse 82 is derived from the output of the pulse generator 10 and is fed back between line 72 and ground. The cusp shaped wave form 83 is derived by integrating the sawtooth shaped voltage derived from condenser 41, in R.-C. network 42—36. These two waves are added in the input circuit of control tube 33, the resultant combination being shown by curve 84 of Fig. 5E. The negative feedback pulse portion of the composite pulse occurs in synchronism with the retrace portion of the sawtooth characteristic deflection coil current, wave 81, as controlled by the sawtooth voltage generated across capacitor 41 which is coupled via capacitor divider 59—60 to the input of power amplifier 62. Plate current of tube 62 flowing through transformer primary 66 induces a voltage in the secondary 69 which is connected across the deflection load coils 11. When condenser 41 is discharged by the blocking oscillator tube 45, tube 62 is cut off and current ceases to flow through transformer primary 66. Since there is no driving voltage induced in transformer secondary 69 at this time, the deflection coils 11 coupled thereacross "see" the equivalent of an open circuit across its terminals. The deflection coils 11 and the inherent stray capacity thereacross form a tuned circuit which is now shocked into oscillation. As the current in the coils decays, a very high negative voltage in the form of a pulse is realized between line 72 and ground. This pulse is impressed across feedback and delay circuit 14 through line 72 to form a portion of the said composite pulse 84 shown in Fig. 5E. Resistance-condenser combination 34, 35 is inserted in the feedback and delay circuit to attenuate this negative feedback pulse, before it is added to the integrated sawtooth pulse realized across capacitor 36.

The free running frequency of blocking oscillator tube 45 in the absence of any other control bias, is governed mainly by the time constant of the resistance-capacitance network in its grid circuit. Immediately prior to the time of conduction in tube 45 the grid voltage slowly approaches cut-off along a curve which is made up of two components. One component is supplied by the discharge of capacitor 54 through resistance 46, thereby producing an exponentially varying bias voltage between the grid and cathode of tube 45. The second component is derived from tuned circuit 57 which is connected between terminal 56 and sweep capacitor 41. This L.-C. circuit is tuned to oscillate at a slightly higher frequency than the pulse repetition frequency of the input synchronizing pulse 80, shown in Fig.

1a. When capacitor 41 discharges through blocking oscillator tube 45, tuned circuit 57, being connected into the discharge circuit, is shocked into oscillation. The oscillations continue after blocking oscillator tube 45 is cut off, thereby causing a sine wave voltage to be impressed across resistance 46. The resultant grid bias voltage, being the combination of these two components, tends to approach cut-off along a curve more nearly at right angles to cut off than the asymptotic curve of the normal R.-C. blocking oscillator varying grid bias alone would allow.

By inserting a variable D. C. bias in the grid circuit by way of resistance 44, the time at which this grid voltage reaches cut-off can be controlled, thereby controlling the frequency of the oscillator. The action of the phase comparison circuit, from which this control voltage is taken, will now be more fully described.

It can readily be seen that the amount of plate current flowing in tube 33 is directly proportional to the energy content of the input pulse. Since all sync pulses have been amplitude limited in synchronizing separator 13, this means that the plate current flowing in tube 33 is actually proportional to the width of the pulse impressed across its input circuit. In order to control the width of the pulse as actually fed to the grid circuit of tube 33, the composite feedback pulse 84 is used to pulse width modulate the input pulse 80. Assuming that the frequency of the blocking oscillator is in synchronism with the input pulse, the grid circuit of tube 33 sees only the pulse 85 shown above cut-off, in Fig. 5F. The sharp negative going portion of wave 84, Fig. 5E, controls the width of the input pulse 80 by effectively cutting off a portion of the pulse which would otherwise be above the cut-off voltage of tube 33, thereby varying the plate current of tube 33, and thus the control bias of oscillator tube 45. Obviously, any change in the phase relationship between the input pulse 80 and the composite feedback pulse impressed on the grid circuit of tube 33 will result in a broader or narrower pulse being fed to the grid of tube 33. If it is assumed that the blocking oscillator is operating at a frequency slower than the pulse repetition frequency of input pulse 80, it follows that the composite pulse 84 will slightly lag the position of the composite pulse shown in Fig. 5E. This means that input pulse 80 will not be width modulated to the extent shown in Fig. 5F, whereby plate current will flow in tube 33 during the period of the wider pulse. This allows a greater oscillator control voltage to be built up in the cathode circuit of tube 33, thereby tending to speed up the frequency of oscillator 45. As the frequency of oscillator tube 45 speeds up, the composite pulse 84, Fig. 5E, is accordingly advanced in phase. If the oscillator tends to operate at a faster frequency than the pulse repetition frequencies of input pulse 80, composite pulse 84 is advanced in phase relative to the position shown in Fig. 5E. This results in a narrower pulse being fed to the input circuit of tube 33, due to the increased width modulation resulting from the cutting action of the negative going portion of wave 84. Tube 33, therefore, passes plate current during a shorter interval, and less oscillator control bias is built up in its cathode circuit, thereby tending to slow down the frequency of the oscillator.

It is to be noted that the negative going portion of the composite pulse is generated so as to always be in synchronism with the retrace portion of the deflection coil current wave. This can be seen by comparing curves B and C of Fig. 5.

The operation of the circuit including a delay line, comprising inductances 37 and 38, capacitor 39 and damping resistor 40, will now be explained. Since the phase comparison circuit, shown within the dashed outline 12 is designed to produce a control voltage proportional to the average phase difference between the synchronizing input pulse and the composite feedback pulse, the addition of a delay line forces the phase comparison circuit to produce a voltage in its cathode circuit, proportional to the average phase difference between the input pulse and the delayed composite pulse. This control voltage produced in the cathode circuit of tube 33 tends to force the pulse generator shown within the dashed outline 10 to produce a composite pulse which is in synchronism with the input pulse, even though the composite pulse has been delayed. In other words, the pulse generator 10 phase advances the undelayed composite feedback pulse because the generator is forced to bring the delayed composite pulse in synchronism with the input pulse. Pulses 86 and 87, shown in Fig. 5G, indicate this resultant phase advancement. The dashed curve 87 illustrates the position of the actual undelayed composite pulse on the time axis, prior to being delayed. Curve 86, Fig. 5G, illustrates the delayed composite pulse in synchronism with the synchronizing input pulse, and added thereto. Since, as heretofore explained above, the sharply negative going component of the undelayed composite pulse 87 is in synchronism with the retrace portion of the sawtooth current wave, 89, Fig. 5I, flowing in the deflection coils, then it follows that when the undelayed composite pulse 87 is phase advanced relative to the input pulse 80, the retrace portion of wave 89 necessarily must be phase advanced relative to the synchronizing pulse 80. This means that the inclusion of the delay line in the circuit of Fig. 5 forces the retrace portion of the sawtooth current wave 89 in deflection coil load 11 to be phase advanced sufficiently so as to be included in the period covered in the blanking pulse 88 shown in Fig. 5H.

Thus it will be seen that I have provided an indirectly synchronized deflection system for a television receiver, wherein the automatic frequency control system effects synchronism between the synchronizing pulses and a delayed reference pulse, whereby actual retrace of the deflection system is phase advanced with respect to the blanking pulse period. The over-all result is that more of the blanking pulse period is usefully employed.

While I do not desire to be limited to any specific circuit parameters, such parameters varying in accordance with the requirements of individual designs, the following circuit values have been found entirely satisfactory in one successful embodiment of the invention, in accordance with Fig. 4.

| | |
|---|---|
| Potentiometer 53 | 50,000 ohms |
| Resistance 29 | 2.7 megohms |
| Resistance 34 | 560,000 ohms |
| Resistance 42 | 150,000 ohms |
| Resistance 43 | 820,000 ohms |
| Resistances 44, 47 | 150,000 ohms |
| Resistance 46 | 100,000 ohms |
| Resistance 48 | 8,200 ohms |
| Resistance 58 | 100,000 ohms |
| Resistance 61 | 47 ohms |
| Resistance 63 | 100 ohms |

| | |
|---|---|
| Resistance 90 | 68,000 ohms |
| Resistance 91 | 120,000 ohms |
| Capacitor 31 | 120 microfarads |
| Capacitor 32 | .002 microfarad |
| Capacitor 35 | 6.8 micromicrofarads |
| Capacitor 36 | 96 micromicrofarads |
| Capacitor 41 | 2000 microfarads |
| Capacitor 49 | .2 microfarad |
| Capacitor 50 | .02 microfarad |
| Capacitor 51 | .04 microfarad |
| Capacitor 54 | 200 microfarads |
| Capacitor 59 | 390 microfarads |
| Capacitor 60 | 10–160 microfarads |
| Capacitor 64 | 4 microfarads |
| Capacitor 92 | 30–240 microfarads |
| Tubes 33, 45 | 6SN7 |
| Tube 62 | 6BG6 |
| Tube 70 | 5V4G |
| Delay line | 1 to 2 microseconds |
| Inductances 37, 38 | 22.5 millihenries |
| Capacitor 39 | 6.8 micromicrofarads |
| Resistor 40 | 39,000 ohms |

While there has been shown and described what is at present considered the preferred embodiment of the present invention, it will be obvious to those skilled in the art that various changes and modifications may be made therein without departing from the invention as defined by the appended claims.

I claim:

1. In an indirectly synchronized deflection system for television receivers, the combination comprising a pulse generator whose frequency is direct current signal controlled, a load circuit coupled to the output of said pulse generator, phase comparison means coupled to the input of said pulse generator having an input circuit adapted to receive synchronizing pulses for detecting phase relationship among a plurality of signals and producing the direct current control signal, a signal feedback circuit including delay means coupling the output of said generator and the input of said phase comparison means, said phase comparison means producing synchronism between the synchronizing pulses and the fedback signals comprising said plurality of signals, whereby the output pulses of said generator realized across said load are phase advanced relative to the synchronizing pulses in direct proportion to the delay time interval.

2. The system defined in claim 1 wherein the said delay means comprises an artificial transmission line.

3. The system defined in claim 2 wherein the said artificial transmission line has a high characteristic impedance.

4. The system defined in claim 3 wherein the pulse generator comprises a source of sawtooth signals and wherein the output of said pulse generator applies sawtooth signals to said feedback circuit.

5. The system defined in claim 4 wherein the said pulse generator comprises a source of sawtooth signals and a source of recurring pulses each of which recurring pulses is produced in a substantially fixed time phase relationship with the retrace portion of the sawtooth wave and in which the output of said pulse generator applies both said sawtooth signals and said recurring pulses as a composite reference signal to said feedback circuit.

6. The system defined in claim 5 wherein the said recurring pulses are negative going pulses.

7. The system defined in claim 6 wherein the sawtooth generator is of the blocking oscillator type.

8. The system defined in claim 7 wherein the phase comparison means is of the pulse duration modulator type adapted to produce phase-error signals in the form of a direct current potential whose magnitude is proportional to the amplitude and duration of the duration modulated synchronizing pulse input.

9. The system defined in claim 8 wherein the said signal feedback circuit includes a pulse integrating circuit.

10. The system defined in claim 9 wherein the said pulse integrating circuit comprises a resistance-capacitance network.

11. The system defined in claim 10 wherein the said load circuit includes the electromagnetic coils of a cathode ray tube.

12. A device for maintaining the output pulse of a cathode ray-tube deflection system in synchronism with synchronizing pulses comprising: means for sampling the output of said cathode ray-tube deflection system to produce reference signals, means for effectively delaying said reference signals, means responsive to the delayed reference signals and the synchronizing signals for developing periodic pulses each having an energy content dependent on the phase relationships between said signals, means for integrating said periodic pulses to derive a unidirectional control potential having a magnitude dependent on the average phase relationship, and means for applying said control potential to the frequency-control circuit of said system to effect synchronism between the synchronizing pulses and the delayed reference signals, whereby the output pulse of said system is phase-advanced relative to said synchronizing pulses.

13. In a deflection system of the type which includes a source of retrace pulses and a pulse width type of AFC control circuit which responds to the synchronizing pulses and to applied retrace pulses to effect synchronism between those two types of pulses, the improvement which comprises a delay network for causing the AFC system to effect synchronism between the sync pulses and the retrace pulses as delayed and applied, whereby actual retrace is phase advanced with respect to the blanking pedestal.

CHARLES R. EDELSOHN.

REFERENCES CITED

The following references are of record in the file of this patent:

UNITED STATES PATENTS

| Number | Name | Date |
|---|---|---|
| 2,230,819 | White | Feb. 4, 1941 |
| 2,284,378 | Dome | May 26, 1942 |
| 2,414,546 | Nagel | Jan. 21, 1947 |
| 2,440,418 | Tourshou | Apr. 27, 1948 |
| 2,466,784 | Schade | Apr. 12, 1949 |
| 2,474,474 | Friend | June 28, 1949 |
| 2,478,744 | Clark | Aug. 9, 1949 |
| 2,492,090 | Bass | Dec. 20, 1949 |